United States Patent
Pender et al.

(10) Patent No.: US 8,170,911 B1
(45) Date of Patent: May 1, 2012

(54) INCENTIVE PROGRAM AWARDING POINTS PER-MILE-DRIVEN

(75) Inventors: Frank R. Pender, San Mateo, CA (US); Heather Cornwell Gray, Oakland, CA (US); Douglas C. Leighton, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1624 days.

(21) Appl. No.: 10/844,039

(22) Filed: May 11, 2004

(51) Int. Cl.
*G06Q 30/00* (2012.01)
*G05B 19/418* (2006.01)

(52) U.S. Cl. .................... 705/14.27; 705/56; 701/29

(58) Field of Classification Search .............. 705/14, 705/56, 1; 701/29, 24
See application file for complete search history.

(56) References Cited

U.S. PATENT DOCUMENTS

| | | | |
|---|---|---|---|
| 6,366,848 B1 | 4/2002 | Gustavsson | |
| 6,389,337 B1 * | 5/2002 | Kolls | 701/29 |
| 6,980,960 B2 * | 12/2005 | Hajdukiewicz et al. | 705/14.34 |
| 7,103,573 B2 * | 9/2006 | Mobed et al. | 705/56 |
| 2003/0055666 A1 * | 3/2003 | Roddy et al. | 705/1 |

OTHER PUBLICATIONS

"www.frequentflier.com". 20040410. p. 3 of 4.*
Top 10 quality logistics ideas. (Winners of traffic management's second Top Ten Quality Logistics Ideas). Traffic Management, v30, n10, p. 40(7). Oct. 1991.*
New Holland Auto Group, Auto Rewards, printed Apr. 9, 2004, www.newhollandauto.com/autorewards/.
Dealer Choice Rewards, Reynolds and Reynolds, Press Release, www.phx.corporate-ir.net/phoenix.zhtml?c=84204&p=IRO1-SingleRelease&t=Regular&id, printed Aug. 3, 2004.
Dealer Choice Rewards, A Reynolds Loyalty Solution, Reynolds and Reynolds.

* cited by examiner

*Primary Examiner* — John Weiss
*Assistant Examiner* — Victoria Vanderhorst
(74) *Attorney, Agent, or Firm* — Kilpatrick Townsend and Stockton LLP

(57) ABSTRACT

Embodiments in accordance with the present invention relate to incentive programs awarding loyalty points based at least in part upon the number of miles driven in a motor vehicle. In accordance with one embodiment of the present invention, reward points can be earned by having the vehicle serviced at authorized locations, such as a dealership. At the time of servicing, the authorized location notes the current vehicle odometer reading, and this odometer reading is communicated to an administrator of the loyalty program. The odometer reading in turn serves as the basis for calculating the number of miles driven since the last authorized servicing, and for conversion of this mileage figure into loyalty points to be credited to the owner, lessor, or renter of the vehicle. In this manner, a manufacturer of an automobile or other sponsor of a co-branded payment card can provide incentives for servicing only at manufacturer-authorized locations such as dealerships, thereby enhancing profitability of the dealership and promoting relations between manufacturer and dealer.

13 Claims, 2 Drawing Sheets

INCENTIVE PROGRAM AWARDING POINTS PER-MILE-DRIVEN

FIELD OF THE INVENTION

The present invention generally relates to consumer loyalty programs for payment cards, and more specifically to a consumer loyalty program awarding incentives based in part upon the number of miles driven in a motor vehicle.

BACKGROUND OF THE INVENTION

Many businesses currently make use of so-called "loyalty" programs that reward customers for frequent purchase of the business's products or services. Well known loyalty programs include frequent flyer mileage programs, frequent guest programs at hotels, programs to reward frequent purchases at food markets, etc.

Issuers of payment cards such as credit cards have implemented programs wherein the payment card is co-branded with a particular retailer or manufacturer. In using such co-branded payment cards, consumers may earn additional reward points for purchasing merchandise using the card.

Generally, consumers earn additional points for shopping at the store or purchasing the merchandise of the co-brand partner. For example, purchases made at the co-branded partner store may result in the accrual of two points for spending with the specific co-brand partner retailer, and one point for all purchases made elsewhere. Once certain point thresholds are met, the consumer receives a reward from the co-brand partner, such as a discount certificate, merchandise or a gift certificate.

An airline program, on the other hand, typically offers an airline frequent flyer mile for every dollar spent. The miles earned by cardholder are added to the consumer's frequent flyer account so that they can earn free air travel more quickly.

The above-referenced conventional co-branded credit-card loyalty programs attract frequent purchasers of products by a particular retailer, or those wishing to travel by air. However, they do not entice the users of other types of products and services.

Hence, it would be desirable to provide incentive programs which reward customers for the use of payment cards for other types of goods or services.

BRIEF SUMMARY OF THE INVENTION

Embodiments in accordance with the present invention relate to incentive programs awarding loyalty points based at least in part upon the number of miles driven in a motor vehicle. In accordance with one embodiment of the present invention, reward points can be earned by having the vehicle serviced at authorized locations, such as a dealership. At the time of servicing, the authorized location notes the current vehicle odometer reading, and this odometer reading is communicated to an administrator of the loyalty program. The odometer reading in turn serves as the basis for calculating the number of miles driven since the last authorized servicing, and for conversion of this mileage figure into loyalty points to be credited to the owner, lessor, or renter of the vehicle. In this manner, an automobile manufacturer or other sponsor of a co-branded payment card can provide incentive to service the vehicle only at manufacturer-authorized locations such as dealerships, thereby enhancing profitability of the dealership and promoting relations between manufacturer and dealer.

The foregoing, together with other features, embodiments, advantages of the present invention, will become more apparent when referring to the following specification, claims, and accompanying drawings.

DETAILED DESCRIPTION OF THE INVENTION

Figure 1:
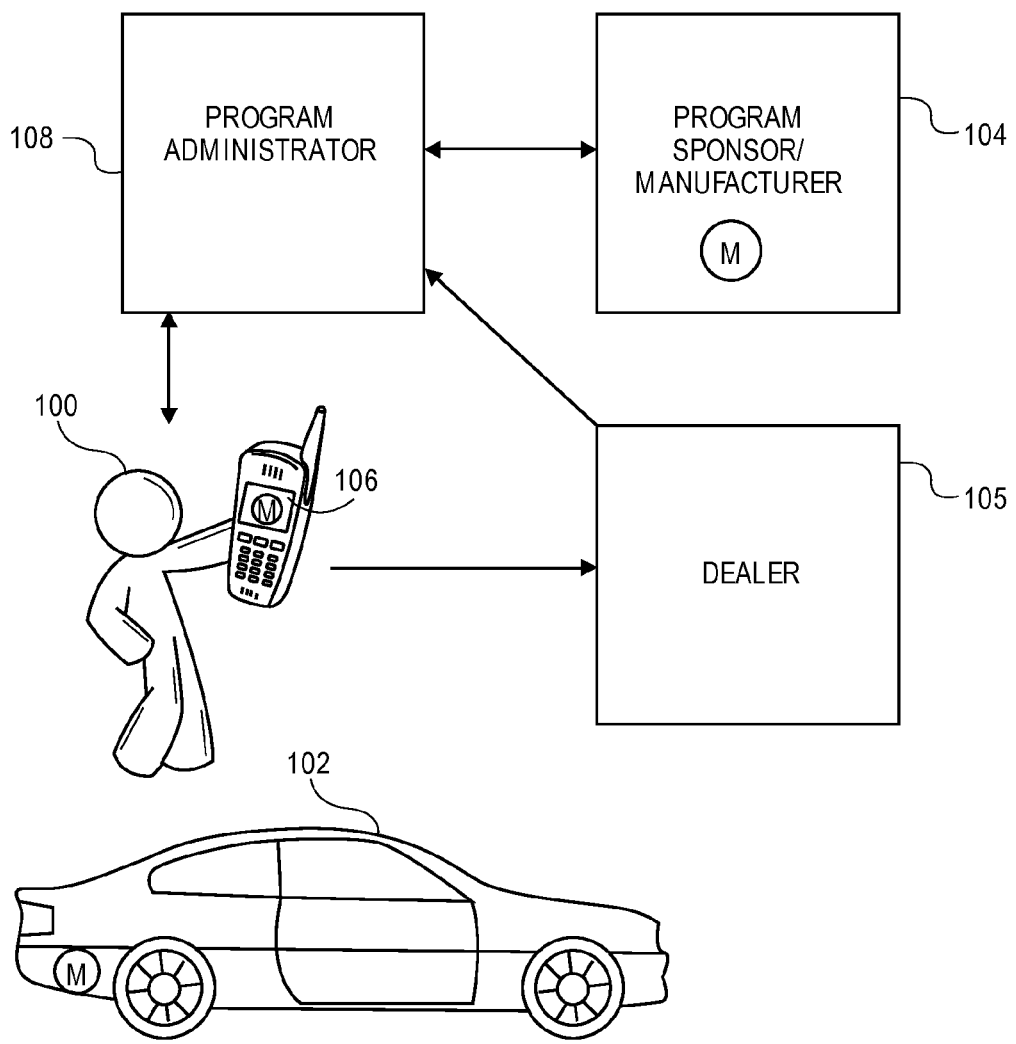
FIG. 1 is a simplified schematic diagram illustrating an exemplary embodiment of the present invention.

FIG. 1 shows a simplified schematic diagram illustrating one embodiment of a loyalty system in accordance with an embodiment of the present invention. Individual 100 possesses vehicle or automobile 102 produced by manufacturer 104 and sold and serviced by dealership 105. Individual 100 may lease automobile 102 or own title to automobile 102 outright.

Individual 100 also possesses payment card 106 such as a credit card or debit card which is associated with a loyalty program that is sponsored by one or more sponsors including, for example, a payment card issuer, manufacturer 104, dealership 105, and/or some other parties. The loyalty program is administered by program administrator 108. Program administrator 108 can be a sponsor of the loyalty program or a third party used to administer the loyalty program on behalf of the one or more sponsors. In one arrangement, payment card 106 is co-branded with automobile manufacturer 104; however, co-branding with other parties is also possible.

Purchases of products and services relating to the automobile manufacturer 104 and/or dealership 105 result in the accrual of loyalty points. Examples of such loyalty-eligible purchased products and services include replacement parts or fees for maintenance or repair.

In addition, unlike conventional co-branded loyalty type programs, loyalty points may also be accrued by individual 100 based upon the number of miles driven in the vehicle 102. For example, upon bringing automobile 102 for servicing to a manufacturer-authorized establishment such as dealership 105, a technician would note the current odometer reading.

The dealer 105 would then enter this updated odometer information into the car owner's record, and record the information in a manner allowing it to be communicated back to the program administrator 108. Such communication of mileage information back to the program administrator 108 could be accomplished in a number of ways.

In one approach, the latest odometer reading could be actively communicated from the dealer 105 to the program administrator 108 as part of a paper-based form. In another approach, the mileage information could be actively communicated from the dealer 105 to the program administrator 108 using a computer network, such as an internet-based, password-protected system. In such an embodiment, the dealership 105 may enter the relevant odometer information directly into the system, for transmission to the program administrator 108.

In still another approach, the latest odometer reading could be made recorded and made available for systematic collection, as the manufacturer 104 retrieves electronic data from the files of local car dealerships 105. In such an embodiment, details relating to services performed at a dealership 105 could first be entered into a database accessible to the manufacturer 104. Manufacturer 104 can then provide the relevant data to program administrator 108 for appropriate processing and update.

Following communication of the latest odometer reading to the program administrator 108, the number of miles driven since the previous service would be calculated, and then converted to a point total. The point total can be calculated in a number of ways. For example, the conversion can be done using some reduced multiplier (for example, one point for every five miles driven). Based on the disclosure and teachings provided herein, a person of ordinary skill in the art will appreciate other ways and/or methods to calculate the point total.

Data from the service record would then be used to update the point balance of the consumer's co-branded payment card. The additional miles driven could be credited to the account of the co-branded card for conversion into loyalty points. In certain embodiments, these mileage-accrued points may be deposited into the same account as points conventionally earned via cardholder spending, thereby enabling the consumer to earn rewards more quickly.

A points per-mile-driven loyalty program in accordance with embodiments of the present invention seeks to allow mileage points to be earned and accounted for, only when the cardholder brings his/her vehicle to a dealership 105 or location that has been authorized by manufacturer 104 for service. Therefore, in order to encourage regular visits by cardholders to manufacturer-authorized service locations, and to discourage cardholders from using service locations not authorized by the manufacturer 104, the program may impose a limit upon mileage accrued between successive visits. In this manner, a cardholder would be precluded from establishing a low beginning mile figure, and then returning to the dealership 105 only after a long intervening period in order to seek credit on a large number of accrued miles.

Figure 2:
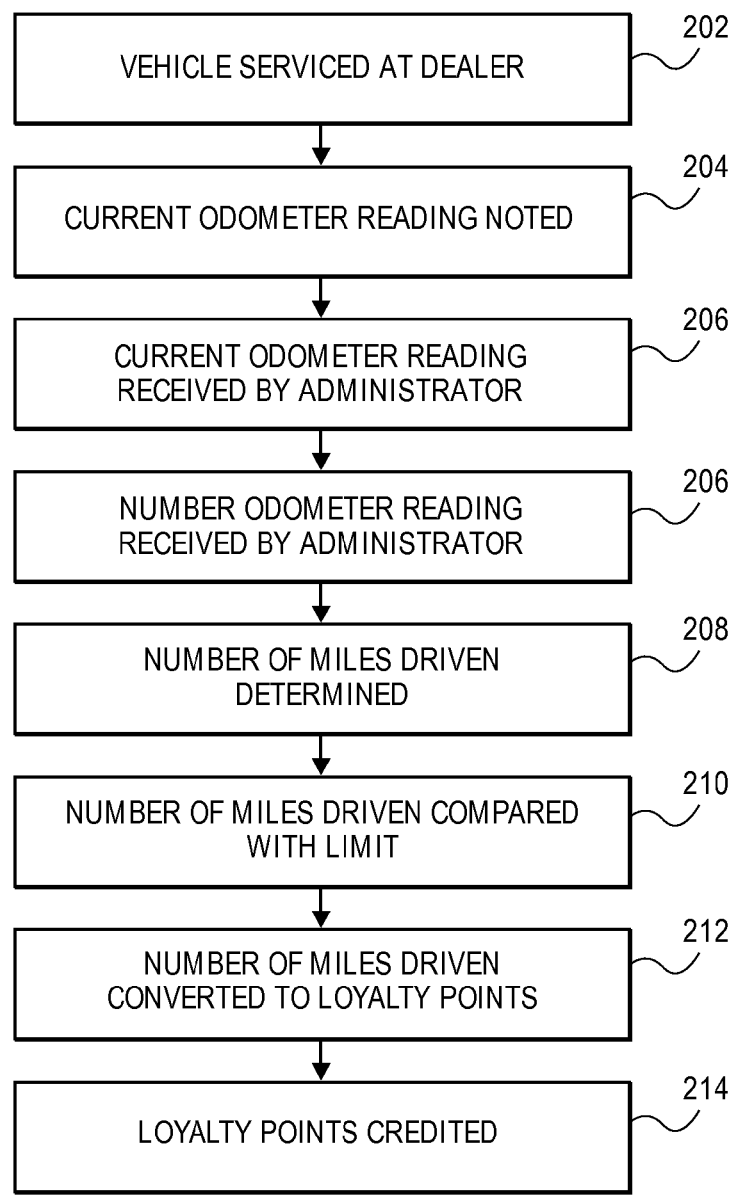
FIG. 2 is a simplified flow chart illustrating steps of one embodiment of a method in accordance with the present invention.

FIG. 2 shows a simplified flow chart of steps for a method 200 in accordance with one embodiment in accordance with the present invention. In a first step 202, the vehicle 102 is brought to dealer 105 for servicing. In second step 204, a technician at the dealer 105 notes the vehicle's current odometer reading. In third step 206, the current odometer reading is received by a loyalty program administrator 108. In a fourth step 208, the loyalty program administrator 108 compares the current odometer reading with a previous odometer reading to determine a number of miles driven.

In optional fifth step 210, the number of miles driven is compared with a predetermined maximum limit. if the number of miles driven exceeds the limit, the number of miles driven is reduced to the predetermined maximum limit.

In sixth step 212, the administrator 108 converts the number of miles driven to loyalty points. In seventh step 214, the loyalty points are credited to the user's account.

The present invention can be implemented in the form of control logic in software or hardware or a combination of both. For example, a number of servers and/or computer systems (with control logic and/or programming instructions residing thereon) located respectively at program administrator 108, manufacturer 104 and dealership 105 can be used to implement the present invention. In one implementation, these servers and/or computer systems can communicate with one another via a computer network, such as, the Internet. Based on the disclosure and teachings provided herein, a person of ordinary skill in the art will appreciate other ways and/or methods to implement the present invention.

Embodiments in accordance with the present invention offer a number of benefits to the various participants in the program. To the cardholder, the program offers an additional source of loyalty points, enhancing their accumulation and subsequent redemption for value. To the dealership accepting the card, the program provides an incentive to draw customers to its maintenance and repair resources.

To the co-branded manufacturer, the program offers a variety of benefits. First, the program offers a way to maintain positive dealer relationships. Specifically, car repair is a major profit driver for automobile dealerships. In accordance with the loyalty program described above, customers seeking to maximize earned loyalty points will prefer dealership service to other, non-manufacturer approved sources such as individual mechanics. This will improve profitability of the dealerships and enhance their goodwill toward the sponsoring manufacturer, who typically but not necessarily bears the burden of paying for administration of the loyalty program.

Embodiments of loyalty programs in accordance with the present invention also promote servicing of vehicles by authorized locations employing manufacturer-certified service personnel. This helps ensure proper maintenance of the automobiles, reducing customer complaints and enhancing public perception of the high quality of the vehicle, and by association the reputation of its manufacturer.

Finally, embodiments of loyalty programs in accordance with the present invention offer manufacturer the ability to track ownership of the vehicle after purchase. By making the loyalty program available not only to original owners but also purchasers of used vehicles, the location of the vehicle can be tracked. This tracking allows the manufacturer to maintain contact with the current owner, for example in the event of a recall or to provide specialized offers for the purchase of a replacement vehicle.

Although specific embodiments of the invention have been described, various modifications, alterations, alternative constructions, and equivalents are also encompassed within the scope of the invention. For example, while the above description focuses upon a loyalty program in which points are awarded based upon the number of miles driven by an automobile, the present invention is not limited to that particular embodiment. In one alternative embodiment, incentive or loyalty points could be awarded to a holder of a payment card based upon the number of miles driven in another kind of ground vehicle, including but not limited to a motorcycle or recreational vehicle (RV).

And while the loyalty program has been described above in connection with incentives awarded to the owner of a vehicle, this is also not required by the present invention. In accordance with alternative embodiments, an individual other than a vehicle owner may be rewarded on a per-miles-driven basis. For example, an individual leasing or renting a vehicle could also be rewarded on a per-mile-driven basis.

Moreover, while the loyalty program has been described above in connection with a payment card co-branded with an automobile manufacturer, this is also not required by the present invention. In accordance with alternative embodiments, the co-branding partner could be other than an automobile manufacturer, for example a rental car company, a gasoline company, a specific automobile dealership, or a provider of specific services such as a chain of oil changing or exhaust repair stations.

And while the loyalty program described above relates to a co-branded payment card, this is also not required by the present invention. In accordance with alternative embodiments, per-miles-driven loyalty points could be accrued for other than a payment card account, for example a basic loyalty account that is not tied to a payment instrument such as a credit or debit card.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method of providing an incentive to a possessor of a ground vehicle, the method comprising:
   receiving, from a location authorized by a manufacturer of the ground vehicle and at a computer system operated by a loyalty program administrator, data relating to a number of miles driven in the ground vehicle; and
   using the computer system operated by the loyalty program administrator, awarding a reward based upon the number of miles driven in the ground vehicle, wherein the reward comprises one or more points accumulated in a loyalty account, wherein the loyalty account is associated with a payment card, wherein the number of miles driven is recognized by reading an odometer of the vehicle at only the location authorized by the manufacturer of the ground vehicle, wherein the location authorized by the manufacturer of the ground vehicle is a dealership associated with the manufacturer of the ground vehicle, wherein purchases of products and services relating to the manufacturer or the dealership by the possessor using the payment card also results in the accrual of points in the loyalty account, and wherein the loyalty program administrator imposes a limit on the number of miles driven in the ground vehicle that are eligible for the reward between successive visits to the dealership.

2. The method of claim 1 wherein the payment card is selected from the group consisting of a credit card and a debit card.

3. The method of claim 1 wherein the payment card is co-branded with a party other than the manufacturer of the vehicle.

4. The method of claim 3 wherein the party is selected from the group consisting of a rental car company, a gasoline company, and a provider of specific services.

5. The method of claim 4 wherein the party is the provider of specific services and is a chain of oil changing companies or a chain of exhaust repair stations.

6. The method of claim 1 wherein the payment card is co-branded with the manufacturer of the vehicle.

7. The method of claim 1 wherein the odometer is read during servicing of the vehicle.

8. The method of claim 1 wherein the ground vehicle is selected from the group consisting of an automobile, a motorcycle, and a recreational vehicle.

9. The method of claim 1 wherein the possessor is selected from the group consisting of an owner, a lessor, and a renter of the ground vehicle.

10. The method of claim 1 wherein the odometer reading is sent to the program administrator over a computer network.

11. The method of claim 10 wherein the odometer reading is recorded and made available for systematic collection into a database.

12. The method of claim 11 wherein the database is accessible by the dealership and the manufacturer.

13. The method of claim 1 wherein the loyalty program administrator is selected from the group consisting of a payment card issuer, the manufacturer, and the dealership.

* * * * *